United States Patent [19]
Edwards et al.

[11] 3,733,474
[45] May 15, 1973

[54] APPARATUS AND METHOD FOR PROVIDING CORRECTED NORMALIZED SIGNALS CORRESPONDING TO THE COMPOSITION OF A MATERIAL

[75] Inventors: Richard R. Edwards, Groves; Walker L. Hopkins, Houston; Leland A. Chvatal, Port Arthur; Thomas R. Cooper, Groves, all of Tex.

[73] Assignee: Texaco Inc., New York, N.Y.

[22] Filed: Sept. 1, 1971

[21] Appl. No.: 177,028

[52] U.S. Cl. ..........235/151.35, 73/23.1, 340/347 CC
[51] Int. Cl. ..........................G01n 31/08, G06g 7/48
[58] Field of Search.........................235/151.35, 183, 235/151.3; 340/347 CC, 347 SH; 73/23.1

[56] References Cited

UNITED STATES PATENTS

| | | | |
|---|---|---|---|
| 3,475,600 | 10/1969 | Spence | 235/151.35 X |
| 3,434,062 | 3/1969 | Cox | 340/347 CC UX |
| 3,506,818 | 4/1970 | Smith | 235/151.35 X |
| 3,555,260 | 1/1971 | Karohl | 235/151.35 X |
| 3,628,003 | 12/1971 | Spence | 235/151.35 X |

*Primary Examiner*—Joseph F. Ruggiero
*Attorney*—Thomas H. Whaley and Carl G. Ries

[57] ABSTRACT

The apparatus includes a chromatograph which samples material and provides a first signal, having peaks corresponding to different constituents of the material, and a pulse signal. Each pulse in the pulse signal coincides with a different peak amplitude occuring in the first signal. In accordance with the signals from the chromatograph, one circuit determines the area under the curve, the curve being the first signal, for each peak in the first signal. Another circuit determines a different baseline for each peak and the area under each baseline. A third circuit receiving signals from the first two circuits effectively subtracts each baseline area fro a peak from the area under the curve associated with the peak to determine a peak area for each peak. The peak area signals are multiplied by thermal conductivity factors to provide signals corresponding to the concentration of the components of the material. A programmer responsive to the pulse signal from the chromatograph controls sample and hold circuits receiving the first signal from the chromatograph to provide peak height voltages. The peak height voltage for each peak is divided into a corresponding percent concentration signal to provide a correction signal. The correction signals are multiplied with the peak height voltages to provide corrected signals corresponding to the concentrations of the components of the material. The corrected signals are normalized by summing the corrected signals and dividing each corrected signal by the resulting sum signal.

8 Claims, 4 Drawing Figures

APPARATUS AND METHOD FOR PROVIDING CORRECTED NORMALIZED SIGNALS CORRESPONDING TO THE COMPOSITION OF A MATERIAL

BACKGROUND OF THE INVENTION

Field of the Invention

The present invention relates to test instruments in general and, more particularly, to a chromatograph with associated self-correcting circuitry.

SUMMARY OF THE INVENTION

Apparatus provides corrected normalized signals corresponding to the composition of a material. The apparatus includes a chromatograph which samples the material and provides a first signal and a pulse signal. Each pulse in the pulse signal coincides with a different peak amplitude occurring in the first signal. A circuit controlled by the pulse signal provides a plurality of voltages, each voltage corresponding in amplitude to a different peak amplitude of the first signal from the chromatograph. A network, using the first signal and the pulse signal from the chromatograph and the voltages from the circuit, provides correction signals. The voltages from the circuit are converted to the corrected normalized signals in accordance with the correction signals from the network.

One object of the present invention is to provide apparatus for testing material and which provides signals corresponding to the concentration of each component of the material being tested.

Another object of the present invention is to provide apparatus, having a self-calibrating system, for testing material and which provides corrected normalized signals corresponding to the concentration of each component of the material being tested.

Another object of the present invention is to correct voltages corresponding to peaks of a signal from a chromatograph testing material with each correction factor corresponding to the ratio of the peak area, as modified by a thermal factor, to the peak amplitude.

The foregoing and other objects and advantages of the invention will appear more fully hereinafter, from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1A:
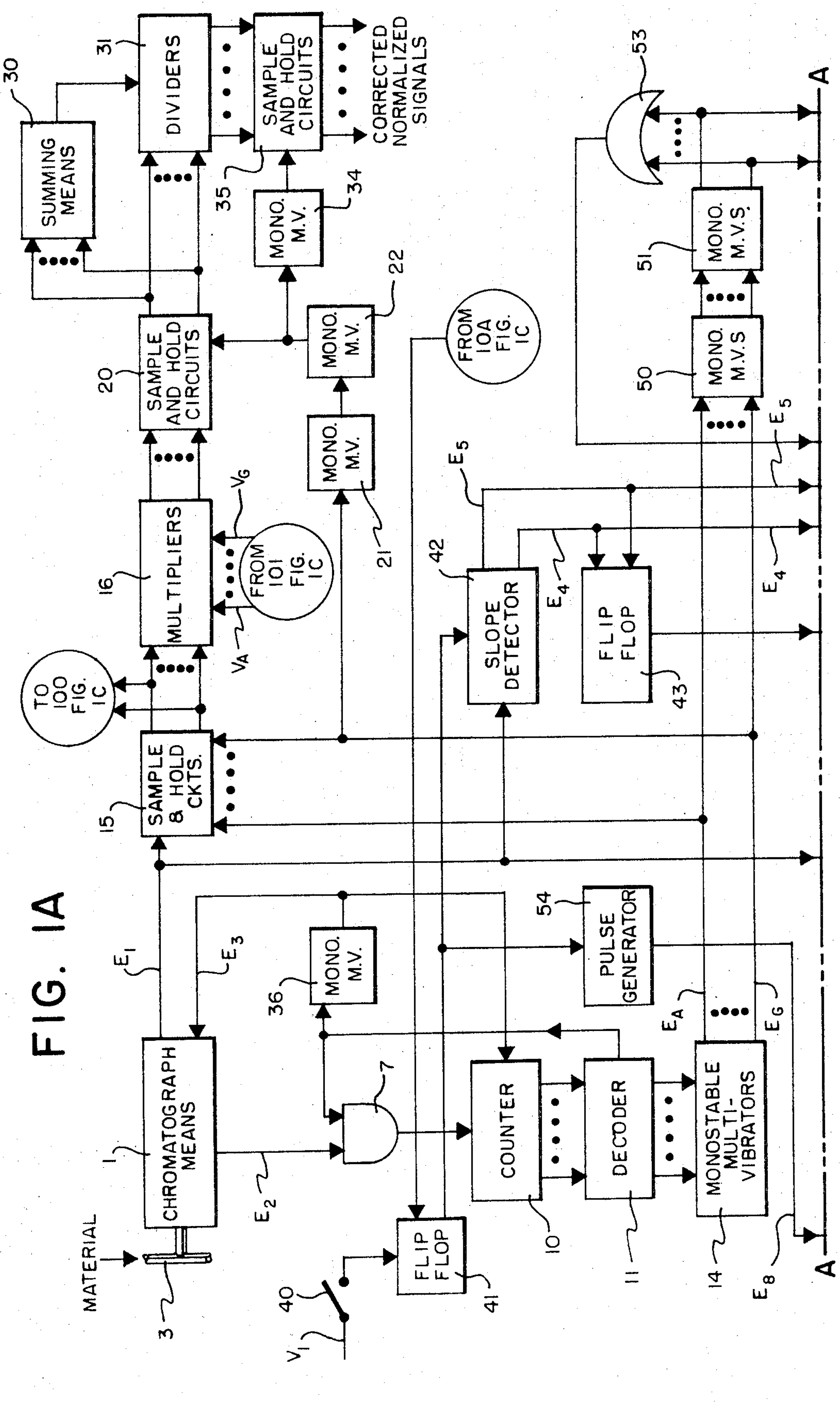
FIGS. 1A, 1B and 1C when matched along matching lines A—A and B—B comprise a simplified block diagram of apparatus, constructed in accordance with the present invention, for testing material and providing corrected normalized signals corresponding to the concentrations of the components of the material, FIGS. 1A, 1B and 1C shall hereinafter be referred to as FIG. 1.
Figure 1B:
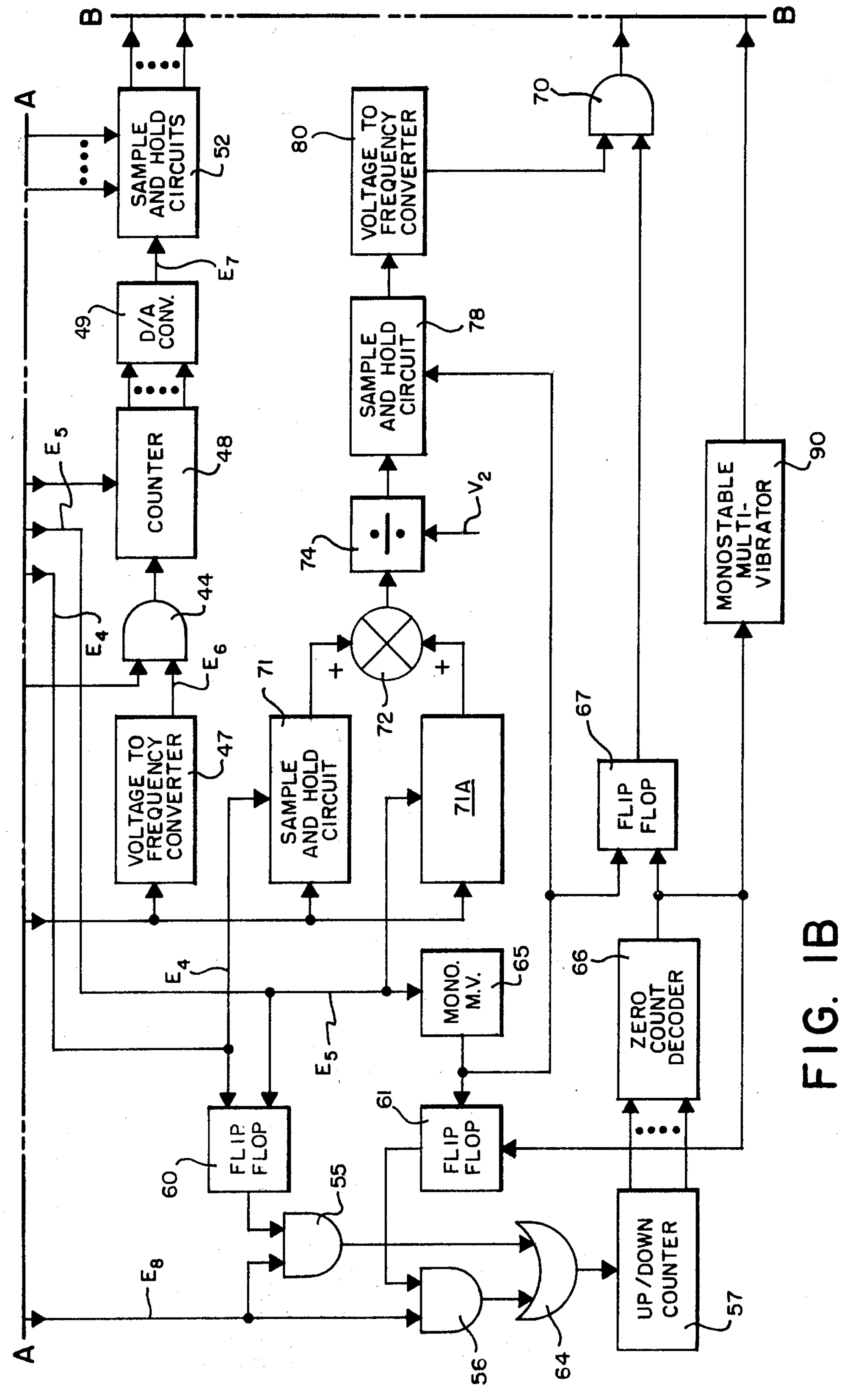
Figure 1C:
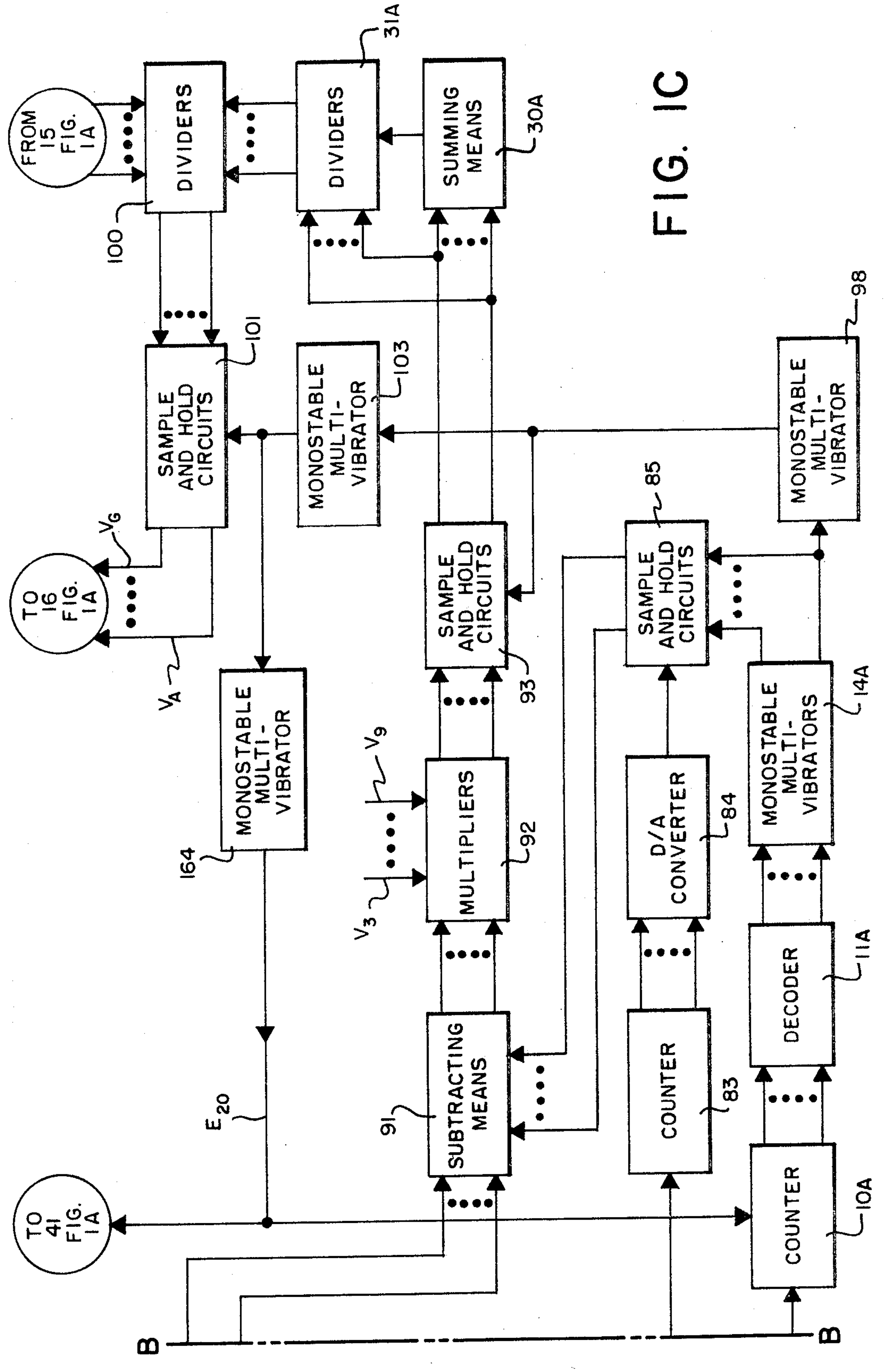
Figure 2:
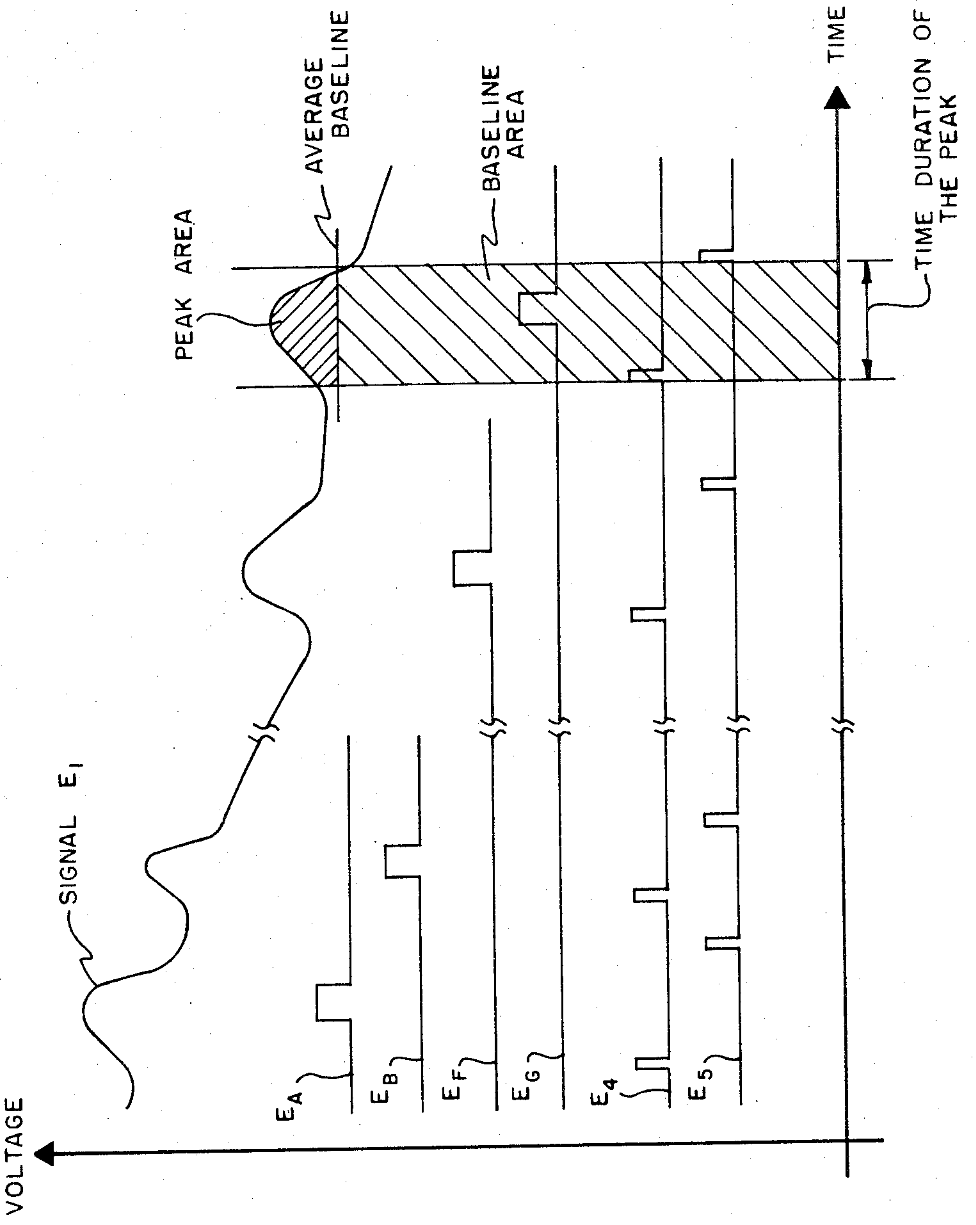
FIG. 2 is a diagrammatic representation of a signal from the chromatograph means, control pulses from some of the monostable multivibrators and pulses from the slope detector shown in FIG. 1. The breaks in FIG. 2 indicate that portions were omitted for ease of explanation.

Referring to FIG. 1, there is shown chromatograph means 1 sampling material in a line 3 to provide a signal $E_1$, which is shown in FIG. 2, and a pulse signal $E_2$. Pulses in signal $E_2$ coincide with different amplitude peaks of signal $E_1$. The pulses of pulse signal $E_2$ pass through an enabled AND gate 7 and are counted by a counter 10. A decoder 11 provides a plurality of outputs corresponding to different counts in counter 10. One output from decoder 11 is initially a high level direct current voltage which enables AND gate 7 and changes to a low level direct current voltage when the count in counter 10 corresponds to the number of significant peaks in signal $E_1$. The low level direct current voltage from decoder 11 disables AND gate 7 to prevent further counting by counter 10 until it is reset.

Each output of decoder 11 triggers a different monostable multivibrator of a plurality of monostable multivibrators 14 so that multivibrators 14 provide a plurality of control pulses $E_A$ through $E_G$. Control pulses $E_A$, $E_B$, $E_F$ and $E_G$ are shown in FIG. 2. Each control pulse of control pulses $E_A$ through $E_G$ controls a different sample and hold circuit of a plurality of sample and hold circuits 15 to hold a different peak of signal $E_1$ from chromatograph means 1. The amplitude of the held peak voltages corresponds to the composition of the material in line 3. Sample and hold circuits 15 provide the peak voltages to a plurality of multipliers 16 receiving correction signals $V_A$ through $V_G$. Each multiplier of multipliers 16 multiplies a different peak voltage with its corresponding correction signal to provide a corrected signal.

Control pulse $E_G$ from multivibrators 14 triggers a monostable multivibrator 21 which acts as a time delay to allow the corrections of the peak voltages to occur and in turn triggers yet another monostable multivibrator 22. The pulse from multivibrator 22 causes each sample and hold circuit of a plurality of sample and hold circuits 20 to hold a different corrected signal from multipliers 16. Summing means 30 sums the held corrected signals from circuits 20 to provide a signal to a plurality of dividers 31. Each divider in dividers 31 divides a different held corrected signal from circuits 20 to effectively normalize the corrected signal so that dividers 31 provide corrected normalized signals. The pulse output of monostable multivibrator 22 triggers another monostable multivibrator 34 to provide a pulse to a plurality of sample and hold circuits 35. Each circuit of sample and hold circuits 35 holds a different corrected normalized signal from dividers 31 in response to the pulse output from multivibrator 34 to provide the corrected normalized signals corresponding to the concentrations of the components of the material.

When the output from decoder 11 to AND gate 7 changes to a low level the output triggers a monostable multivibrator 36 to provide a cycle reset pulse $E_3$ to chromatograph means 1 and to counter 10. Chromatograph means 1 and counter 10 are reset by pulse $E_3$ to repeat the sampling operating as heretofore described.

Correction signals $V_A$ through $V_G$ correspond to different ratios of percent concentration of a component of the material to peak height for the peaks in signal $E_1$. Referring to FIG. 2. the area of each peak is determined by determining the area under the curve defined by the signal $E_1$ for the time interval of the peak. A base line for each peak in signal $E_1$ is determined and the area under the baseline for a peak is subtracted from the area under the curve for the peak which yields the peak area for that peak.

Referring back to FIG. 1, in developing signals $V_A$ through $V_G$, a switch 40, which may be a 'momentary on' type of switch, when activated, momentarily applies a direct current voltage $V_1$ to a flip-flop 41 changing flip-flop 41 to a set state. Flip-flop 41, as all other flip-flops in the description, provides a high level direct current output when it is in the set state and a low level direct current output when it is in a clear state. The high level direct current output from flip-flop 41 enables a slope detector 42 while a low level output disables detector 42. Slope detector 42 receives a signal $E_1$ and provides a pulse $E_4$ at the start of each peak and another pulse $E_5$ at the end of each peak as shown in FIG. 2. Slope detector 42 may be of the type manufactured by Infotronics Corporation as a peak sensor PCB-PK SR-100A with triggers PCB-PST-2.

Pulse $E_4$ triggers a flip-flop 43 to a set state while pulse $E_5$ triggers flip-flop 43 to a clear state. Flip-flop 43 enables an AND gate 44 when in a set state and disables AND gate 44 when in a clear state.

Signal $E_1$ from chromatograph means 1 is also applied to a voltage to frequency converter 47 which provides pulses $E_6$, corresponding in frequency to the amplitude of signal $E_1$, to AND gate 44. AND gate 44 when enabled passes pulses $E_6$ to a counter 48, and blocks pulses $E_6$ when disabled, so that counter 48 counts pulses $E_6$ during the time duration of the peak in signal $E_1$ being detected by detector 42. The count in counter 48 corresponds to the area under the curve for signal $E_1$ for the peak. A conventional type digital to analog converter 49 converts the count in counter 48 to an analog signal $E_7$.

Control pulse $E_A$ through $E_G$ from monostable multivibrators 14 trigger different multivibrators of a plurality of time delay monostable multivibrators 50, each of which in turn triggers a corresponding multivibrator in a plurality of monostable multivibrators 51. Each multivibrator of multivibrators 51 provides a control pulse a predetermined time interval after a corresponding peak in signal $E_1$ has passed. Each pulse from multivibrators 51 passes through an OR gate 53 to reset counter 48 before each new peak is detected. Different sample and hold circuits of a plurality of sample and hold circuits 52 are enabled by the pulses from multivibrators 51 so that each sample and hold circuit provides a signal corresponding to an area under the curve for a different peak of signal $E_1$.

The high level output from flip-flop 41 also enables pulse generator 54 to provide timing pulses $E_8$. Timing pulses $E_8$ are applied to AND gates 55 and 56, which control the counting of time pulses $E_8$ by a conventional type up-down counter 57 in accordance with outputs from flip-flops 60, 61. Pulse $E_4$ from detector 42 triggers flip-flop 60 to a set state. Flip-flop 60 enables AND gate 55 when in the set state and disables AND gate 55 when in the clear state. When enabled, AND gate 55 passes pulses $E_8$. Pulses $E_8$ from AND gate 55 pass through an OR gate 64 to counter 57. Counter 57 counts up the passed pulses until pulse $E_5$ triggers flip-flop 60 to a clear state to block further counting by counter 57 except as hereinafter described. The count in counter 57 corresponds to the width of a peak in signal $E_1$ being detected by detector 42.

Pulse $E_5$ also triggers a monostable multivibrator 65, which acts as a time delay, to provide a pulse. The trailing edge of the pulse provided by multivibrator 65 causes flip-flop 61 to change to a set state. Flip-flop 61 controls AND gate 56 in the same manner as flip-flop 60 controlled AND gate 55. Due to the high level output from flip-flop 61 while in the set state, counter 57 will now count down. Timing pulses $E_8$ pass through AND gate 56 and OR gate 64 causing counter 57 to count down from the count previously contained.

A zero count decoder 66 provides an output to a flip-flop 67 when counter 57 reaches a zero count and no output when the count in counter 57 is not zero. Flip-flop 67 is triggered to a set state by the pulse output from decoder 66. Flip-flop 67 enables an AND gate 70 when in the set state and disables AND gate 70 when in the clear state.

AND gate 70 controls the determination of the areas under the baselines which is made by sample and hold circuits 71, 71A and 78, summing means 72, a divider 74, a voltage to frequency converter 80, a counter 83 and a digital-to-analog converter 84. Elements identified by a number with a suffix are connected and operate in a similar manner as elements having the same numbers without a suffix. Pulses $E_4$ and $E_5$ from detector 42 cause sample and hold circuits 71, 71A to sample and hold signal $E_1$ at the start and the end of each peak, respectively. The outputs from sample and hold circuits 71, 71A are summed by summing means 72 and the sum signal is divided by a direct current voltage $V_2$ which corresponds to a value of 2 by divider 74. The output of divider 74 corresponds to an average baseline for the peak being detected by detector 42. The pulse from multivibrator 65 which occurs at the end of the peak being detected causes sample and hold circuit 78 to hold the output from divider 74.

Voltage to frequency converter 80 provides pulses corresponding in frequency to the amplitude of the output held by circuit 78, to AND gate 70. AND gate 70 effectively passes the pulses to counter 83 for the time duration of the peak of signal $E_1$ being detected so that the count in counter 83 corresponds to the area under the average baseline associated with that peak. Converter 84 converts the count in counter 60 to an analog signal which is applied to a plurality of sample and hold circuits 85.

When counter 57 reaches a zero count, decoder 66 triggers a monostable multivibrator 90 whose pulse output is counted by a counter 10A. Counter 10A, decoder 11A and a plurality of monostable multivibrators 14A operate in the same manner as counter 10, decoder 11 and monostable multivibrators 14 to provide control pulses. Each control pulse controls a different sample and hold circuit of circuits 85 to hold the output from converter 84 so that each sample and hold circuit of circuits 85 provides a signal corresponding to the area under a baseline associated with a particular peak. Subtracting means 91 subtract each baseline area signal provided by sample and hold circuits 85 from a corresponding area under the curve signal from sample and hold circuits 52, so that subtracting means 91 provides a plurality of outputs, each output corresponding to an area of a peak in signal $E_1$.

A plurality of multipliers 92 receive direct current voltage $V_3$ through $V_9$. Each voltage of voltages $V_3$ through $V_9$ corresponds to a different constituent of the material in line 3. Each output from subtracting means 91 is multiplied with a corresponding voltage of voltages $V_3$ through $V_9$ by a multiplier of multipliers 92 to provide an output to a different sample and hold circuit of a plurality of circuits 93. The last pulse voltage from multivibrator 14A triggers another monostable multivibrator 98 causing it to provide a pulse to sample and hold circuits 93, causing them to sample and hold the outputs from multipliers 92.

The outputs from sample and hold circuits 93 are normalized by summing means 30A and dividers 31A and the normalized outputs provided by dividers 31A are applied to a plurality of dividers 100. Each divider of dividers 100 receives a different output from sample and hold circuits 15 and divides that output into a corresponding normalized output from dividers 31A so as to provide a signal corresponding to the ratio of percent concentration of a component of the material to peak height for a particular peak. A plurality of sample and hold circuits 101 are controlled by a monostable multivibrator 103 which is responsive to the pulse output from multivibrator 98 to sample and hold the outputs from dividers 101 to provide correction signals $V_A$ through $V_G$ to multipliers 16.

The pulse output from multivibrator 103 triggers another monostable multivibrator 104, causing it to provide a reset pulse $E_{20}$. Reset pulse $E_{20}$ resets flip-flop 41 and counter 10A so that the correction signals can be redeveloped at a further time.

The apparatus of the present invention as heretofore described tests material and provides corrected normalized signal corresponding to the composition of the material being tested. The apparatus includes developing correction signals for each peak of a signal from a chromatograph testing the material. Each correction signal corresponds in amplitude to the ratio of the percent concentration of a component of the material to the peak amplitude of a peak in the signal from the chromatograph.

What is claimed is:

1. Apparatus for providing corrected normalized signals corresponding to the composition of a material, comprising chromatograph means sampling the material and providing a first signal and a pulse signal, each pulse in the pulse signal coinciding with a different peak amplitude occurring in the first signal, means controlled by the pulse signal for providing a plurality of voltages, each voltage corresponding in amplitude to a different peak amplitude of the first signal, means receiving the first signal and the pulse signal from the chromatograph means and the plurality of voltages from the voltage means for providing correction signals, means responsive to the pulse signal from the chromatograph means for sampling and holding each peak of the first signal from the chromatograph means, means connected to the sample and hold means and to the correction signal means for multiplying each held peak voltage with a corresponding correction signal to provide corrected peak voltages, and means connected to the multiplier means for normalizing each corrected peak voltage to provide corrected normalized signals.

2. Apparatus as described in claim 1 in which the correction signal means includes means responsive to the pulse signal from the chromatograph means and receiving the first signal from the chromatograph means for providing a plurality of signals, each signal corresponding to the area of a different peak in the first signal, and means connected to the sample and hold means, to the peak area signal means and to the multiplier means for dividing each held peak voltage from the sample and hold means with a corresponding peak area signal to provide the correction signals.

3. Apparatus as described in claim 2 in which the peak area signal means includes means connected to the chromatograph means for providing a plurality of signals, each signal corresponding to the area under the curve for a different peak of the first signal from the chromatograph means, occurring means connected to the chromatograph means for determining an average baseline for each peak of the first signal and providing corresponding signals, means connected to the baseline signal means for determining the area under each baseline and providing signals corresponding thereto, and means connected to the area under the curve signal means for subtracting each baseline area signal from a corresponding area under the curve signal to provide the signals corresponding to the peak areas.

4. Apparatus as described in claim 3 in which the area under the curve signal means includes a slope detector receiving the first signal from the chromatograph means and providing a first pulse at the start of each peak and a second pulse at the end of each peak in the first signal, a voltage to frequency converter receiving the first signal from the chromatograph means and providing a pulse signal having a frequency corresponding to the amplitude of the first signal from the chromatograph means, counting means, switching means connected to the slope detector and to the voltage to frequency converter and controlled by the pulses from the slope detector to pass the pulse signal from the voltage to frequency converter to the counting means between each first and second pulses from the slope detector so that each count in the counting means corresponds to the area under the curve for a different peak of the first signal from the chromatograph means, means connected to the counting means for providing the signals corresponding to the area under the curve for each peak in the first signal in accordance with the counts in the counting means; and the baseline signal means includes second sample and hold means for sampling the first signal from the chromatograph means at the start of each peak and at the end of each peak of the first signal, means connected to the second sample and hold means for providing a signal corresponding to the average baseline in accordance with the held portions of the first signal from the second sample and hold means, a second voltage to frequency converter providing the pulse signal having a frequency corresponding to the amplitude of the voltage baseline signal, second counting means, means controlled by the pulses from the slope detector to provide signals corresponding to the time base of each peak of the first signal provided by the chromatograph means, switching means controlled by the time base signals from the time base signal means for controlling the counting by the counting means of the pulses in the pulse signal from the second voltage to frequency converter so that each count in a second counting means corresponds to an area under a different baseline, and means connected to the second counting means for providing the signals corresponding to the baseline area in accordance with the counts contained in the second counting means.

5. A method providing corrected normalized signals corresponding to the composition of a material, which comprises sampling the material, providing a first signal in accordance with the sample and a pulse signal, each pulse in the pulse signal coinciding with a different peak amplitude occurring in the first signal, providing a plurality of voltages in response to the pulse signal and in accordance with the first signal, each voltage corresponding in amplitude to a different peak amplitude of the first signal, providing correction signals in accordance with the first signal, the pulse signal and the plurality of voltages, sampling and holding each peak of the first signal, multiplying each held peak voltage with a corresponding correction signal to provide corrected peak voltages, and normalizing each corrected peak voltage to provide corrected normalized signals.

6. A method as described in claim 5 in which the providing correction signal step includes providing a plurality of signals, each signal corresponding to the area of a different peak in the first signal, and dividing each held peak voltage with a corresponding peak area signal to provide a correction signal.

7. A method as described in claim 6 in which the providing peak area signal step includes providing a plurality of signals, each signal of said second plurality corresponding to the area under the curve of the first signal for a different peak of the first signal, determining the voltage baseline for each peak of the first signal, providing a signal corresponding to each average baseline, determining the area under each baseline in accordance with the baseline signals, providing signals corresponding to the areas under the baselines and subtracting each baseline area from a corresponding area under the curve to provide a signal corresponding to the peak area.

8. A method as described in claim 7 in which the providing area under the curve signal step includes providing the first pulse at the start of each peak in the first signal and a second pulse at the end of each peak, providing a first pulse signal having a frequency corresponding to the amplitude of the first signal, connecting the pulses in the first pulse signal between each first pulse and each second pulse so that each count corresponds to the area under the curve for a different peak of the first signal, providing the signals corresponding to the areas under the curve for each peak in accordance with the counts; and the providing the baseline signals steps including sampling and holding the first signal at the start of each peak and at the end of each peak of the first signal, providing a signal corresponding to the average baseline in accordance with the last mentioned held portions of the first signal, providing a second pulse signal having a frequency corresponding to the amplitude of the average pulse line signal, counting the pulses in the second pulse signal during those portions of the second pulse signal associated with the peaks of the first signal so that each count of the second counting corresponds to an area under a different baseline and providing signals corresponding to the baseline areas in accordance with the counts of the last mentioned counting step.

* * * * *